US006408351B1

United States Patent
Hamdi et al.

(10) Patent No.: US 6,408,351 B1
(45) Date of Patent: Jun. 18, 2002

(54) HOST MODEM HAVING A PERIPHERAL CODEC POWERED BY A PERIPHERAL BUS

(75) Inventors: Rabah S. Hamdi, Houston; Edward E. Olkkola, Tomball; David Christopher Dorsey, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/052,815

(22) Filed: Mar. 31, 1998

(51) Int. Cl.[7] .......................... G06F 13/14; G06F 13/20
(52) U.S. Cl. .......................... 710/63; 710/64; 455/557; 713/300; 713/322
(58) Field of Search ................................ 713/322, 300; 455/557; 710/63, 64

(56) References Cited

U.S. PATENT DOCUMENTS

| | | | | | |
|---|---|---|---|---|---|
| 5,655,010 | A | * | 8/1997 | Bingel | 379/93.28 |
| 5,765,021 | A | * | 6/1998 | Hsu et al. | 395/828 |
| 5,799,196 | A | * | 8/1998 | Flannery | 395/750.03 |
| 5,802,153 | A | * | 9/1998 | Sridhar et al. | 379/98 |
| 5,875,235 | A | * | 2/1999 | Mohajeri | 379/93.36 |
| 5,883,944 | A | * | 3/1999 | Burke et al. | 379/159 |
| 5,896,574 | A | * | 4/1999 | Bass, Sr. | 455/557 |
| 5,925,114 | A | * | 7/1999 | Hoang | 710/48 |
| 5,931,950 | A | * | 8/1999 | Hsu | 713/300 |
| 5,938,740 | A | * | 8/1999 | Chang | 710/5 |

OTHER PUBLICATIONS

Hardie, 'Start–up PCtel to challenge 56K modem arena', Electronic News, v42, n2157, p.18, Mar. 1997.*
Turley, 'Controllers proliferate as USB catches on', Microprocessor Report, v11, n1, p.22, Mar. 1997.*
Schematic "56K Modem Line Interface", Compaq Drawing No. 70516–000, Compaq Computer Corporation, Jun. 1997.
"An Analysis of Wireless Device Implementations on Universal Serial Bus", USB Wireless White Paper, Jun. 3, 1997.
Universal Serial Bus Specification, Revision 1.0, Jan. 15, 1996.

* cited by examiner

Primary Examiner—Thomas Lee
Assistant Examiner—Rehana Perveen
(74) Attorney, Agent, or Firm—Akin, Gump, Strauss, Hauer & Feld, L.L.P.

(57) ABSTRACT

A peripheral coder/decoder (codec) that has low power consumption such that the peripheral codec facilitates bus-powered peripheral devices that utilize a codec. One such peripheral device is a modem. In the case of host-based modem, a host computer provides processing capabilities while a bus-powered peripheral device contains circuitry for analog-to-digital and digital-to-analog conversions as well as circuitry for interfacing to a transmission media. The bus-powered peripheral device is coupled to the host computer by a peripheral bus. In one embodiment, the peripheral bus is a Universal Serial Bus (USB) bus and the bus-powered peripheral device is a USB device. By being bus-powered, the bus-powered peripheral device does not require its own separate power source. A method for transmitting data over the peripheral bus using the host-based modem and the bus-powered peripheral device are also disclosed.

9 Claims, 8 Drawing Sheets

HOST MODEM HAVING A PERIPHERAL CODEC POWERED BY A PERIPHERAL BUS

SUMMARY OF THE INVENTION

Broadly speaking, the invention relates to a peripheral coder/decoder (codec) that has low power consumption such that the peripheral codec facilitates bus-powered peripheral devices that utilize a codec. One such peripheral device is a modem. In the case of host-based modem, a host computer provides processing capabilities while a bus-powered peripheral device contains circuitry for analog-to-digital and digital-to-analog conversions as well as circuitry for interfacing to a transmission media. The bus-powered peripheral device is coupled to the host computer by a peripheral bus. In one embodiment, the peripheral bus is a Universal Serial Bus (USB) bus and the bus-powered peripheral device is a USB device.

The invention can be implemented in numerous ways, including as a system, a device, an apparatus, and a method. Several embodiments of the invention are summarized below.

As a computer system, one embodiment of the invention includes a computer including a microprocessor, memory and a bus host controller; a bus operatively connected to the computer, the bus being controlled by the bus host controller; and a codec apparatus operatively connected to the computer via the bus, the codec apparatus being completely powered by the bus. Optionally, the codec apparatus is a codec modem and the bus is a serial bus such as a USB bus.

As a USB codec modem peripheral device that uses a host processor for modulation and demodulation processing, an embodiment of the invention includes: a USB bus interface coupled to the host processor via a USB bus; a codec that performs analog-to-digital conversions on incoming signals and digital-to-analog conversions on outgoing signals; and a hybrid circuit that couples the outgoing signals to a transmission medium and couples incoming signals to the transmission medium. Preferably, the USB codec modem is bus-powered by the USB bus, the USB codec modem peripheral device does not include modem circuitry that performs modulation and demodulation operations, and the host processor implements modulation and demodulation operations.

As a method for transmitting and receiving signals using a modem, an embodiment of the invention includes the operations of: coupling a peripheral apparatus having a codec portion of the modem to a peripheral bus of a computer system, the peripheral apparatus lacking capability to perform modulation and demodulation processing; performing modulation and demodulation processing for the modem at a microprocessor of the computer system; and performing codec processing at the codec portion of the peripheral apparatus. The peripheral apparatus is powered exclusively through the peripheral bus.

The advantages of the invention are numerous. One advantage of the invention is that a bus-powered peripheral codec is made available. Examples are a modem codec, a video codec, a pulse coded modulation (PCM) codec, and the like. The peripheral codec is a peripheral device that couples to a computer over a bus, such as a USB bus, and does not require any external power source other than the power provided over the bus itself. Another advantage of the invention is that the peripheral codec has a low gate count and manageable power consumption such that the peripheral codec is able to be bus-powered. Still another advantage of the invention is that, in the case of bus-powered devices, the low power utilization of the peripheral codec prolongs battery life due to its low power consumption. Yet another advantage of the invention is that, in the case where the peripheral codec is used to form a modem codec, the peripheral codec can facilitate remote wakeup of the host computer and/or the peripheral codec based on external events.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
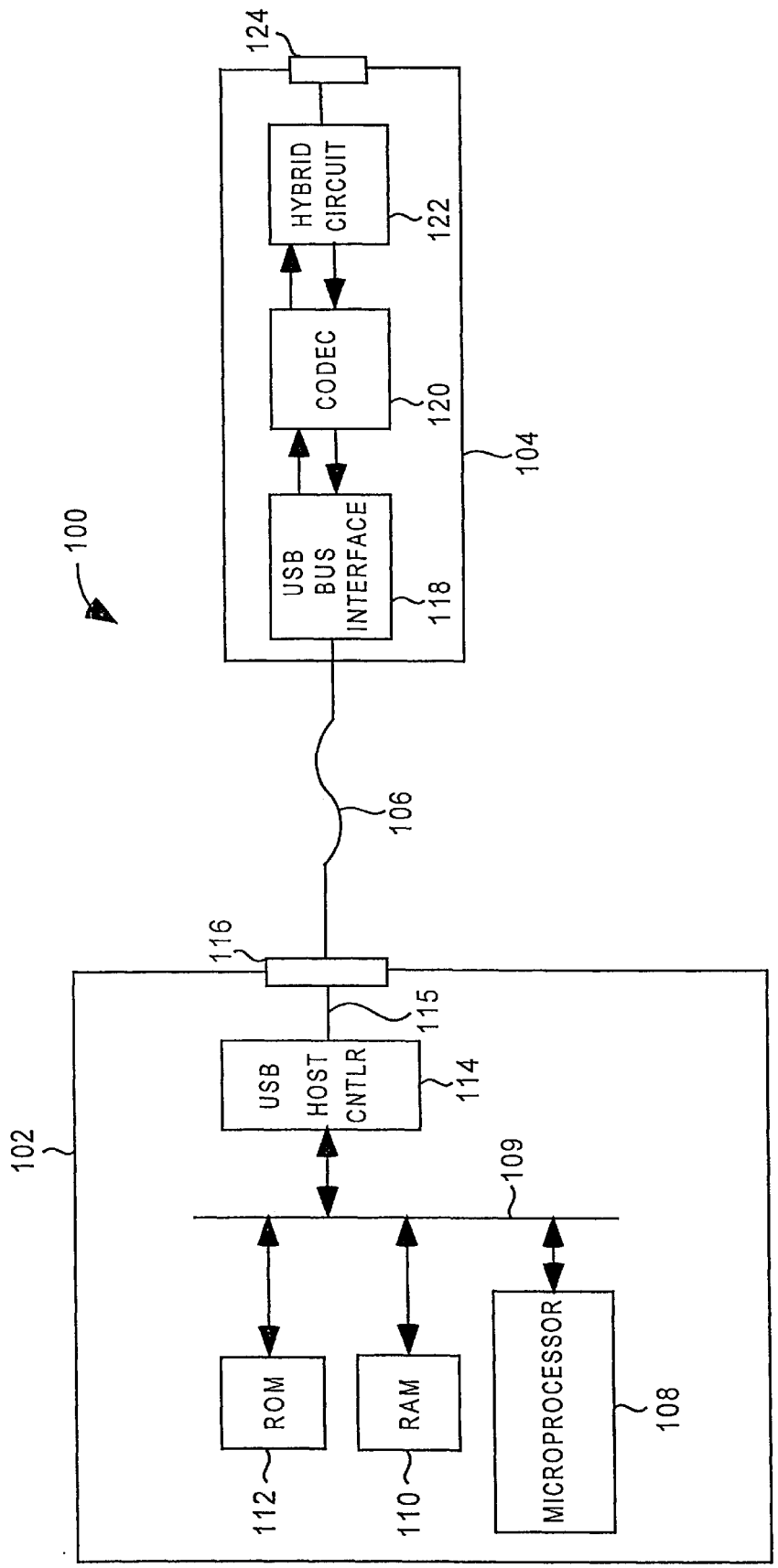
FIG. 1 is a block diagram of a computer system according to an embodiment of the invention.

The invention relates to a peripheral coder/decoder (codec) that has low power consumption such that the peripheral codec facilitates bus-powered peripheral devices that utilize a codec. One such peripheral device is a modem. In the case of host-based modem, a host computer provides processing capabilities while a bus-powered peripheral device contains circuitry for analog-to-digital and digital-to-analog conversions (i.e., codec) as well as circuitry for interfacing to a transmission media. The bus-powered peripheral device is coupled to the host computer by a peripheral bus. In one embodiment, the peripheral bus is a Universal Serial Bus (USB) bus and the bus-powered peripheral device is a USB device.

Before providing a detailed description of the invention, a Universal Serial Bus (USB) specification for a serial peripheral bus for a computer system is explained. Since the invention is suitable for use with USB buses, the USB specification is explained in some detail below Computer systems typically include a bus over which data and control signals are exchanged with peripheral devices. These buses are often categorized as either parallel buses or serial buses. Parallel buses include multiple data lines, whereas serial buses include a single data line (or a differential pair of lines). Examples of parallel buses are Interface Standard Association (ISA) and Peripheral Component Interface (PCI). Examples of serial buses are Apple Desktop Bus (ADB), Access.bus, IEEE P1394, Concentration Highway Interface (CHI), and GeoPort.

Recently, an improved serial bus known as Universal Serial Bus (USB) has been developed. USB is an industry standard extension to the personal computer architecture with a focus on Computer Telephony Integration (CTI), consumer and productivity applications. The USB is described in a Universal Serial Bus Specification, Revision 1.0, dated Jan. 15, 1996, which is hereby incorporated by reference. Although the USB specification document explains USB in detail, below the features and operation of USB are summarized for the reader's benefit.

A range of data traffic can be serviced over a USB bus. The transfer rate for the USB bus is up to 12 Mbs. A USB bus also comprehends mid-speed and low-speed data ranges. Typically, mid-speed data transfers are isochronous and low-speed data transfers come from interactive devices. USB is primarily designed as a desktop bus but is also suitable for the mobile environment. USB has various advantages, including: easy peripheral expansion; low cost transfer rate up to 12 Mbs which can support real-time data for voice, audio and compressed video; protocol flexibility for mixed-mode isochronous data transfers and asynchronous messaging; standardized interface; and suitable for various computer configurations and form factors.

USB is a cable bus that supports data exchange between a host computer and a wide range of simultaneously accessible peripherals. The peripherals attached to a USB share the bandwidth of the USB through a host scheduled token based protocol. The USB specification allows peripherals to be attached, configured, used and detached while the host and other peripherals are in operation. Such is often referred to as dynamic (or hot) attachment and removal.

A USB bus connects USB devices with a USB host. There is only one USB host on any USB system. A host controller interfaces the USB bus to the host computer system. The host controller may be implemented in a combination of hardware, firmware or software. The USB physical interconnect is a tiered star topology. A hub is at the center of each star. Each wire segment is a point-to-point connection between the host and a hub or function, or a hub connected to another hub or function.

USB devices are hubs or functions. Hubs provide additional attachment points to the USB. Functions provide capabilities to the system. All the USB devices present a standard USB interface in terms of their comprehension of the USB protocol, their response to standard operations such as configuration and reset, and their standard capability descriptive information.

Hubs are a key element in the plug-and-play architecture of USB. Hubs serve to simplify USB connectivity from the user's perspective and provide robustness at low cost and low complexity. Hubs are wiring concentrators that enable multiple attachment characteristics of USB. Attachment points on the hubs are referred to as ports. Each hub converts a single attachment point into multiple attachment points. The upstream port of a hub connects the hub towards the host. Each of the other downstream ports of a hub allows connection to another hub or function. Hubs can detect attach and detach at each downstream port and enable the distribution of power to the downstream devices. Each downstream port can be individually enabled and configured as either full or low speed. The hub also isolates low speed ports from full speed signaling ports.

A hub consists of two portions: the hub controller and the hub repeater. The hub repeater is a protocol controlled switch between the upstream port and the downstream ports. It also has hardware support for reset and suspense/resume signaling. The hub controller provides the interface registers that allow communication to/from the host. Hub specific status and control commands permit the host to configure a hub and to monitor and control its ports.

A function is a USB device that is able to transmit or receive data or control information over the bus. A function is typically implemented as a separate peripheral device with a cable that plugs into a port on a hub. However, a physical package may implement multiple functions and an embedded hub with a single USB cable. This is known as a compound device. Each function contains configuration information that describes its capabilities and resource requirements. Before a function can be used, it must be configured by the host. This configuration includes allocating USB bandwidth and selecting function specific configuration options. Examples of functions are: locator devices such as a mouse, tablet, or light pen; input devices such as a keyboard; output devices such as a printer; and telephony adapters such as an ISDN adapter.

The USB host interacts with the USB devices through the host controller. The host and its associated host controller are responsible for managing the use of the USB. Specifically, the host is responsible for detecting the attachment and removal of USB devices, managing control flow between the host and USB devices, managing data flow between the host and USB devices, collecting status and activity statistics, and providing a limited amount of power to attached USB devices.

The USB system software on the host manages interactions between the USB devices and the host-based device software. The general areas of interactions between the USB system software and the device software are: device enumeration and configuration, isochronous data transfers, asynchronous data transfers, power management, and device and bus management information.

A USB host coordinates activity for the USB bus. In particular, the USB host controls all access to the USB bus. In other words, a USB device only gains access to the USB bus by being granted access by the USB host. The USB host is also responsible for monitoring topology of the USB bus.

USB devices are peripheral devices that add additional functionality to the host computer. The types of functionality provided by the USB devices varies widely. To assist the USB host in identifying and configuring USB devices, each USB device carries and reports configuration related information. Some of the information reported is common to all logical devices, while other information is specific to the functionality provided by the device.

Although USB devices physically attach to the USB bus in a tiered star topology, the USB host communicates with each logic device as if it were directly connected to a root port on the host computer. Even though the physical and logical topology of the USB bus reflects this shared nature of the bus, client software manipulating a USB function interface is presented with the view that it deals only with its interfaces of interest. Clients offering USB functions must use USB software programming interfaces to manipulate their functions as opposed to directly manipulating their functions via memory or I/O accesses as with other buses (e.g., PCI, EISA, PCMCIA, etc.).

A USB bus transfers signals and power over a cable having four (4) wires. The signaling occurs over two (2) wires in point-to-point segments. The maximum length of a cable segment is five (5) meters. The signals on each segment are differentially driven into a cable of 90 Ω intrinsic impedance by a differential transmitter. A differential receiver is used to receiver the signals at the other end of the cable and has an input sensitivity of at least 200 mV and sufficient common mode rejection.

There are two modes of signaling. The USB full speed signaling bit rate is 12 Mbs. A limited capability of low speed signaling mode is also defined at 1.5 Mbs. Both modes can be simultaneously supported in the same USB system by mode switching between transfers in a device transparent manner. The low speed mode is defined to support a limited number of low bandwidth devices (e.g., mouse), since more general use would degrade the bus utilization. A clock is transmitted encoded along with the differential data. A SYNC field also proceeds each packet to allow the receiver (s) to synchronize their bit recovery clocks.

The USB specification also covers power management aspects. Each USB segment provides a limited amount of power over the cable. The host supplies power for use by USB devices that are directly connected to the host. In addition, any USB device may have its own power supply. USB devices that rely totally on the power from the cable are called bus-powered devices. In contrast, those USB devices that have an alternate source of power are called self-powered devices. A USB hub in turn supplies power for its connected USB devices. The USB specification permits bus-power hubs within certain constraints of topology.

A USB host has a power management system which is independent from that of the USB. The USB system software interacts with the host's power management system to handle system power events such as SUSPEND or RESUME. Additionally, USB devices can carry USB-defined power management information which allows them to be power managed by system software or generic device drivers.

According to the USB bus protocol, all bus transactions involve the transmission of up to three (3) packets. Each transaction begins when the host controller, on a scheduled basis, sends a USB packet describing the type and direction of the transaction, the USB device address, and endpoint number. The packet is referred to as the Token Packet. The USB device that is addressed selects itself by decoding the appropriate address fields. In a given transaction, data is transferred either from the host to a device or from a device to the host. The direction of data transfer is specified in the token packet. The source of the transaction then sends a Data Packet or indicates it has no data to transfer. The destination in general responds with a Handshake Packet indicating whether the transfer was successful.

The USB data transfer model between a source or destination on the host and an endpoint on a device is referred to as a pipe. There are two types of pipes: stream and message. Stream data has no USB defined structure while message data does. Additionally, pipes have associations of data bandwidth, transfer service type, and endpoint characteristics such as directionality and buffer sizes. Pipes come into existence when a USB device is configured. One message pipe, Control Pipe 0, always exists once a device is powered in order to provide access to the device's configuration, status and control information. The transaction schedule allows flow control for some stream mode pipes. At the hardware level, this prevents buffers from underflow or overflow situations by using a NACK handshake to throttle the data rate. The token for a NACK'ed transaction is reissued when the bus time is available. The flow control mechanism permits the construction of flexible schedules that accommodate concurrent servicing of a heterogeneous mix of stream mode pipes. Thus, multiple stream mode pipes can be serviced at different intervals and with packets of different sizes.

Bus enumeration is the activity that identifies and addresses devices attached to a bus. USB supports USB devices attaching to and detaching from the USB bus at any point in time. Consequently, enumerating the USB bus is an ongoing activity that must accommodate dynamic changes in the physical bus topology.

USB devices often attach to the USB bus via a port on specialized USB devices known as hubs. Hubs indicate the attachment or removal of a USB device in its per port status. The host queries the hub to determine the reason for the notification. The hub then responds by identifying the port used to attach the USB device. Thereafter, the host enables the port and addresses the USB device with a control pipe using the USB Default Address. All USB devices are addressed using the USB Default Address when initially connected or after they have been reset.

The host determines if the newly attached USB device is a hub or a function and assigns a unique USB address to the USB device. The host establishes a control pipe for the USB device using the assigned USB address and endpoint number zero (0). If the attached USB device is a hub and USB devices are attached to its ports, then the above procedure is followed for each of the attached USB devices. If the attached USB device is a function, then attachment notifications will be dispatched by the USB software to interested host software.

When a USB device has been removed from one of its ports, the hub automatically disables the port and provides an indication of device removal to the host. Then, the host removes knowledge of the USB device from any host data structures. If the removed USB device is a hub, then the removal process must be performed for all of the USB devices that were previously attached to the hub. If the removed USB device is a function, removal notifications are sent to the interested software.

USB supports functional data and control exchange between the USB host and a USB device in either a unidirectional fashion or a bidirectional fashion. Data transfers take place between host software and a particular endpoint on a USB device. A given USB device may support multiple data transfer endpoints. The USB host treats communications with any endpoint of a USB device independently from any other endpoint. Such associations between the host software and a USB device endpoint are called pipes. As an example, a given USB device could have an endpoint which would support a pipe for transporting data to the USB device and another endpoint which would support a pipe for transporting data from the USB device.

The USB specification supports four basic types of data transfers: control transfers, bulk transfers, interrupt transfers and isochronous transfers. Control data transfers are used by USB software to configure devices when they are first attached. Bulk data transfers typically consist of larger amounts of data such as used for printers or scanners. Interrupt data transfers are small, spontaneous data transfers from a device. The data being transferred is referred to as interrupt data, and such data may be presented for transfer by a device at any time. Interrupt data typically consists of event notification, characters, or coordinates that are organized as one or more bytes. Isochronous data transfers are continuous and real-time in creation, delivery and consumption. Timing related information is implied by the steady state at which isochronous data is received and transferred.

Isochronous data must be delivered at the rate received to maintain its timing. In addition to delivery rate, isochronous data must also be sensitive to delivery delays. For isochronous pipes, the bandwidth required is typically based upon the sampling characteristics of the associated function. The latency required is related to the buffering available at each endpoint. The timely delivery of isochronous data is ensured at the expense of potential transient losses in the data stream. In other words, any transmission errors are not corrected by hardware mechanisms such as retries. In practice, the core error rate of the USB is expected to be small enough not to be an issue. USB isochronous data streams are allocated to a dedicated portion of USB bandwidth to ensure that data can be delivered at the desired rate. The USB is also designed for minimal delay of isochronous data transfers.

The USB bandwidth is allocated among pipes. The USB allocates bandwidth for some pipes when a pipe is established. USB devices are required to provide some buffering of data. The goal for the USB architecture is to ensure that buffering induced hardware delays are bounded to within a few milliseconds. The bandwidth capacity of the USB can be allocated to the different data streams. The bandwidth allocation is blocking so that further pipe allocations are denied or blocked if they would disturb preexisting bandwidth or latency allocations. Whenever a pipe is closed, the allocated bandwidth is freed up and may be reallocated to another pipe.

USB devices are required to carry information for self-identification and generic configuration. All USB devices are accessed by a unique USB address. Each USB device additionally supports one or more endpoints with which the host may communicate. All USB devices must support especially designated endpoint zero (0) to which the USB device's USB control pipe will be attached. The information needed to completely describe the USB device is associated with the endpoint zero (0). Additionally, each USB device carries USB control and status information.

USB provides a communication service between software on the host computer and its USB function. Functions can have different communication flow requirements for different client to function interactions. USB buses provide better overall bus utilization by allowing the separation of the different communication flows into a USB function. Each communication flow makes use of some bus access to accomplish communication between client and function. Each communication flow is terminated at an endpoint on a device. Device endpoints are used to identify aspects of each communication flow.

A USB logical device appears to the USB system as a collection of endpoints. Endpoints are grouped into endpoint sets which implement an interface. Interfaces are views to the function. System software manages the device using the Default Pipe (associated with Endpoint 0). Client software manages an interface using pipe bundles (associated with an Endpoint Set). Client software requests that data be moved across the USB between a buffer from the host and an endpoint on the USB device. The host controller (or USB device depending on transfer direction) packetizes the data to move it over the USB bus. The host controller also coordinates when bus access is used to move the packet of data over the USB bus.

An endpoint is a uniquely identifiable portion of a USB device that is the terminus of a communication flow between the host and device. Each USB logical device is composed of a collection of independently operating endpoints. Software may only communicate with a USB device via one or more endpoints. Each logical device has a unique address assigned by the system at the time the device is attached. Each endpoint on a device has a device determined unique identifier, known as the endpoint number. The combination of the device address and the endpoint number allows each endpoint to be uniquely referenced. An endpoint has characteristics that determine the type of transfer service required between the endpoint and the client software. Endpoints are in an unknown state before they are configured, and endpoints must not be accessed by the host computer before they are properly configured.

All USB devices are required to have an endpoint with endpoint number 0 that is used to initialize and generically manipulate the logical device, namely to configure the logical device. Endpoint 0 is always configured once a device is attached and powered. Additional endpoints besides endpoint 0 can be configured as part of the device configuration process.

A USB pipe is an association between an endpoint on a device and software on the host. Pipes represent the ability to move data between software on the host computer via a memory buffer and an endpoint on a device. There are two different types of pipe communication modes. One mode is referred to as stream mode in which data is moved through a pipe that has no defined structure. The other mode is a message mode in which data is moved through a pipe with the data having a defined structure. The content of the data delivered through a pipe is not interpreted by the USB bus. Associated with the pipe is a claim on the USB bus access and bandwidth usage, a transfer type, and directionality and payload information.

A software client normally request data transfers via I/O Request Packet (IRPs) through a pipe and then either awaits or is notified when they are completed. If there are no IRPs pending or in progress for a pipe, the pipe is idle and the host controller will take no action with regard to the pipe. If a non-isochronous pipe encounters a STALL condition or three bus errors are encountered on any packet of an IRP, the IRP is aborted/retired, all outstanding IRPs are also retired, and no further IRPs are accepted until the software client recovers from the condition and acknowledges the STALL or error condition.

USB transports data through a pipe between a memory buffer associated with a software client on the host and an endpoint on the USB device. Data transported by message pipes are carried in a USB defined structure. USB also defines that data moved over the bus is packetized for any pipe (i.e., stream or message), but ultimately the formatting and interpretation of the data transported in the data payload of the bus transaction is the responsibility of the client software and the function using the pipe. USB provides different transfer types that are optimized to more closely match the service requirements of the client software and the function using the pipe. In particular, as noted above, USB defines four transfer types, including: controlled transfers, isochronous transfers, interrupt transfers and bulk transfers. Each transfer type determines various characteristics of the communication flow, including data format, direction of flow, packet size constraints, bus access constraints and required data sequences. An IRP uses one or more bus transactions to move information between a software client and its function.

Control transfers are intended to support configuration/command/status type communication flows between client software and its function. Control transfers are supported with bi-directional communication flow over message pipes.

Generally speaking, isochronous transfers have the general implication of constant-rate, error-tolerant data transfers. A requester for a isochronous transfers obtains, from the USB system, guaranteed access to USB bandwidth with bounded latency, a constant data rate through the pipe as long as data is available. Also, no retrying of data transfer is performed in the case of delivery failure due to errors. An isochronous pipe is a stream pipe and is, therefore, always unidirectional. An endpoint description identifies whether a given isochronous pipe's communication flow is into or out of the host computer.

If a device requires bi-directional isochronous communication flow, two isochronous pipes must be used, one in each direction. The packet size constraints limit the maximum data payload size to 1023 bytes for each isochronous pipe. An endpoint in a given configuration for an isochronous pipe specifies the maximum size data payload that it can transmit/receive. The USB system software uses this information during configuration to ensure that there is sufficient bus time to accommodate this maximum data payload in each frame. If there is sufficient bus time for the maximum data payload, the configuration is established; if not, the configuration is not established.

Bus access for isochronous transfers is periodic. In particular, all isochronous pipes normally move exactly one data packet each frame, i.e., every 1 ms. Errors on the bus or delays in operating system scheduling of client software can result in no packet being transferred for a frame. An error indication is returned as status to the client software in such a case. A device can also detect this situation by tracking Start of Frame (SOF) tokens and noticing two SOF tokens without an intervening data packet for an isochronous endpoint.

Isochronous transfers do not support data retransmission in response to errors on the bus. A receiver can determine that an error occurred. Hence, for isochronous transfers, timeliness is more important than correctness/retransmission, and given the low error rates expected on the bus, the protocol is optimized assuming transfers normally succeed.

Interrupt transfers are designed to support those devices that need to communicate small amounts of data infrequently, but with bounded service periods. An interrupt pipe is a stream pipe and is therefore always unidirectional.

The bulk transfer type is designed to support devices that need to communicate relatively large amounts of data at highly variable times where the data transfer can be deferred until bandwidth is available. A bulk pipe is also a stream pipe and is therefore also unidirectional.

Accomplishing any data transfer between the host computer and a USB device requires some use of the USB bandwidth. The process of assigning bus bandwidth to the USB devices is called transfer management. Typically, there are several entities on the host computer that coordinate the information flowing over the USB bus. These entities include the client software, the USB driver, and the host controller driver. Transfer management involves several entities that operate on different objects in order to move transactions over the USB bus. The client software determines what transfers need to be made with the function. The client software uses appropriate operating systems specific interface to request IRPs using the USB driver. The USB driver is involved in mediating bus access while a device is attached to the bus during configuration and normal transfers. The host controller driver is responsible for tracking the IRPs in progress and ensuring that USB bandwidth and frame time maximums are not exceeded.

A host controller has access to a transaction list and it converts transactions into appropriate implementation dependent activities that result in USB packets moving over the USB bus. The transaction list is a description of the current outstanding set of bus transactions that need to be run on the USB bus.

Client software and functions both need to provide buffer space for pending data transactions awaiting their turn on the USB bus. For non-isochronous types, the buffer space need only be large enough to hold the next data packet for each transaction being buffered. For isochronous pipes, the host side and device side buffers in general need to provide storage for approximately twice the amount of data that can be transferred in 1 ms.

Since time is a key part of an isochronous transfer, reliable data transmission over the USB bus requires careful attention to detail. In an isochronous communication system, a transmitter and receiver remain time and data synchronized to deliver data robustly. USB does not support transmission retry of isochronous data so that minimal bandwidth can be allocated to isochronous transfers and time synchronization is not lost due to a retry delay. However, it is critical that a USB isochronous transmitter/receiver pair still remain synchronized both in normal data transmission cases and in cases where errors occur on the bus.

USB includes a framework for isochronous devices which defines synchronization types, feedback and various connections. Isochronous devices include sampled, analog devices and synchronous data devices. The synchronization type classifies an endpoint according to its capability to synchronize its data rate to the data rate of the endpoint that it connected to. Feedback is provided by indicating accurately what the required data rate is relative to the SOF frequency. The ability to make connections depends on the quality of the connection that is required, the endpoint synchronization type, and the capabilities of the host application which is making the connection.

Synchronization type and data rate information are needed to determine if an exact data rate match exists between source and sink, or if an acceptable conversion process exists which would allow the source to be connected to the sink. It is the responsibility of the application to determine whether the connection can be supported within available processing resources and other constraints such as delays.

The endpoints can provide an adaptive operation. The adaptive endpoints are able to source or sink data at any rate within their operating range. Adaptive source endpoints produce data at a rate which is controlled by the data sink. The data sink provides feedback to the source which allows the source to note the desired data rate of the sink.

USB requires that devices prebuffer data before processing/transmission to allow the host more flexibility in managing when each pipe's transaction is moved over the USB bus. For transfers from function to host, the endpoint must accumulate samples during frame X until it receives the Start of Frame (SOF) token packet for frame X+1. It then latches the data from frame X into its packet buffer and is now ready to send the packet containing those samples doing the frame X+1. On the other hand, for transfers from the host system to the function, the endpoint will accept a packet from the host system some time during frame Y. When the function receives the SOF for frame Y+1, it can start processing the data received in frame Y.

This approach allows an endpoint to use the SOF token as a stable clock with very little jitter/drift when the host controller moves the packet over the bus while also allowing the host controller to vary within a frame precisely when the packet is actually moved over the bus. This prebuffering introduces some additional delay between when a sample is available at endpoint and when it moves over the bus compared to an environment where the bus access is exactly the same time offset from start of frame from frame to frame.

Isochronous transfers provide no data packet retries so that timeliness of data delivery is not perturbed. The USB allows sufficient information such that a missing packet can be detected and therefore not unknowingly turned into incorrect data or timing sequence. The mechanisms provided by the protocol to perform the error handling include: exactly one packet per frame, start of frame, CRC, and bus transaction time-out. Isochronous transfers require exactly one data transaction every frame for normal operation. USB does not dictate what data is transmitted in each frame.

Because there are multiple clocks that affect isochronous communication flows in USB, buffering is required to rate match the communication flow across the USB bus. As such, there must be buffer space available both in the device per endpoint and on the host side on behalf of the client software. These buffers provide storage space for data to accumulate until it is time for transfer over the USB bus. Given the data rates of the device, the maximum size of the data packets that move over the USB bus can also be calculated.

Embodiments of the invention are discussed below with reference to FIGS. 1–7. However, those skilled in the art will readily appreciate that the detailed description given herein with respect to these figures is for explanatory purposes as the invention extends beyond these limited embodiments.

FIG. 1 is a block diagram of a computer system 100 according to an embodiment of the invention. The computer system 100 includes a computer 102 that couples to a modem codec board 104 via a USB bus 106. The computer 102 includes a microprocessor 108 that executes instructions to carry out operations for the computer 102. The microprocessor 108 couples to a system bus 109. Also coupled to the system bus 109 is a random-access memory (RAM) 110, a read-only memory (ROM) 112, and a USB host controller 114. The RAM 110 provides temporary data storage for use by at least the microprocessor 108. The ROM 112 typically stores programming instructions for use with the microprocessor 108. The USB host controller 114 operates to manage the USB bus 106 in accordance with the USB specification. More particularly, the USB host controller 114 is used to transmit and receive data over the USB bus 106. The computer 102 also includes a USB port 116. The USB port 116 is used to couple an internal link 115 of the USB bus 106 from the USB host controller 114 to a cable carrying the USB bus 106. According to the USB specification, the cable for the USB bus 106 includes four wires, two of which carry power supply signals and the other two carry differential data. The modem codec board 104 includes a USB bus interface 118 that couples to the cable carrying the USB bus 106. The USB interface 118 interacts with the USB host controller 114 to facilitate the transfer and reception of data over the USB bus 106. The modem codec board 104 includes a transmit data path and a receive data path. The transmit data path operates to receive digital signals over the USB bus 106 from the USB host controller 114 and to produce analog signals that are coupled to the transmission media. As an example, the transmission media can be a phone line (twisted pair, T1, ISDN, etc.). A receive data path receives analog signals from the transmission media and produces digital signals that are supplied to the computer 102 via the USB bus 106. The modem codec board 104 also includes a codec 120 that performs digital-to-analog conversions for the transmit path as well as analog-to-digital conversions for the receive path. Further, the modem codec board 104 includes a hybrid circuit 122 that couples analog signals to/from the transmission media, and a connector 124 that connects the hybrid circuit 122 to the transmission media. For example, the connector 124 can be a RJ-11 connector.

The transmission and reception of data for the computer 102 by the modem codec board 104 operates as follows. First, it should be noted that the modem codec board 104, unlike conventional modem cards, does not include a processing unit, such as a digital signal processor (DSP). Instead, the data processing is performed by the computer 102. Namely the microprocessor 108 of the computer 102 performs the modulation and demodulation processing and related operations that would conventionally be performed by the digital signal processor (DSP) on a conventional modem card.

Accordingly, when the computer 102 has data to be transmitted over the transmission media via the modem codec board 104, the USB host controller 114 manages the USB bus 106 (previously configured for an isochronous data transfer mode) to periodically supply data packets from the USB host controller 114 to the USB bus interface 118 over the USB bus 106. These data packets being periodically supplied to the USB bus interface 118 are formed from data signals that have been modulated by the microprocessor 108 and then held in a buffer to wait their forwarding to the modem codec board 104. The buffer can, for example, be implemented by a portion of the RAM 110. The USB host controller 114 then retrieves the data signals from the buffer as needed, forms data packets, and transmits the data packets periodically to the USB bus interface 108 over the USB bus 106. The data packets are then forwarded to the codec 120 which converts the digital signals into analog signals. The resulting analog signals are then supplied to the hybrid circuit 122 which conditions the analog signals for transmission over the transmission media.

For the reception of data signals by the modem codec board 104, the processing is generally as follows. The analog signals are received over the transmission media at the hybrid circuit 122. The hybrid circuit performs conditioning operations and then supplies the conditioned analog signals to the codec 120. The codec 120 performs analog-to-digital conversion to produce received digital data signals. The received digital data signals are then supplied to the USB bus interface 118 where they are temporarily stored in a buffer until transmitted to the computer 102 over the USB bus 106. Periodically, under the control of the USB host controller 114, the USB bus interface 118 will retrieve the digital data signals from the buffer and form data packets, and then forward the data packets to the USB host controller 114 over the USB bus 106. Upon receiving the data packets, the USB host controller 114 stores the received data packets in a buffer. Again, the buffer may be allocated from a portion of the RAM 110. Thereafter, the microprocessor 108 retrieves the digital data signals from the buffer and performs demodulation processing thereon to obtain the recovered digital data.

According to the isochronous transfer mode of the USB specification, a isochronous pipe for each direction between the USB host controller 114 and the USB bus interface 118 are configured when the modem codec board 104 is connected to the USB port 116 and powered-up. Hence, periodically, namely approximately every 1 ms, a data packet is not only transferred (if available) from the USB host controller 114 to the USB bus interface 118, but also a data packet is transferred (if available) from the USB bus interface 118 to the USB host controller 114. The maximum size of the data packet is 1023 bytes according to the USB specification. The buffering provided by the buffers at the computer 102 as well as at the USB bus interface 118 are sufficiently large enough given the data transfer rate provided by the modem codec board 104 so that the continuity of the data is maintained. Consequently, essentially real-time data transfer is provided using the periodic nature of the isochronous transfer mode of the USB specification. In one embodiment, the modem codec board 104 is designed so as to buffer approximately 2 ms for both the receive path and the transmit path so that data is not dropped due to a buffer overflow or underflow between servicing of the modem codec board 104 by the USB host controller 114.

The invention pertains to a peripheral codec that has low power consumption such that the peripheral codec facilitates bus-powered peripheral devices that utilize a codec. One such peripheral device is a modem. The invention is discussed below in the context of a modem device that includes the peripheral codec. However, it should be recognized that the peripheral codec according to the invention is not limited to its use with respect to a modem but may also be used other peripheral devices. Also, the peripheral codec can be used for not only modem applications but also voice, video, and audio applications. In the modem application discussed below, the peripheral codec is designed to provide a high resolution linear Sigma Delta codec, whereas in other applications the codec design can also be used to provide lower resolution, nonlinear codecs.

FIG. 1 illustrates a host-based modem that can be implemented according to one embodiment of the invention. In FIG. 1, the host-based modem is implemented by the microprocessor 108 in the computer 102 (host computer) and the modem codec board 104. Also, in the embodiment, the host-based modem includes a peripheral bus so that the microprocessor 108 and the modem codec board 104 can interact. The peripheral bus provides not only a data path but also a power source to the modem codec board 104. In a preferred embodiment, the peripheral bus is a USB bus.

Although in FIG. 1 the modem codec board 104 is coupled directly to the computer 102 via the USB bus 106, the modem codec board 104 could also be connected to a hub (i.e., USB hub). In other words, a hub can connect directly to the USB bus 106 and then one or more peripheral devices can connect to the hub. The modem codec board 104 could then be any one of these peripherals connected to the hub. The hub can be connected to the computer 102 by a cable forming a wired USB bus or by wireless USB bus means. Wireless USB bus means for connecting peripheral devices to a computer are disclosed in U.S. Application Number 09/052,744, filed on even date herewith, and entitled "WIRELESS UNIVERSAL SERIAL BUS FOR A COMPUTER SYSTEM," which is hereby incorporated by reference.

Figure 2:
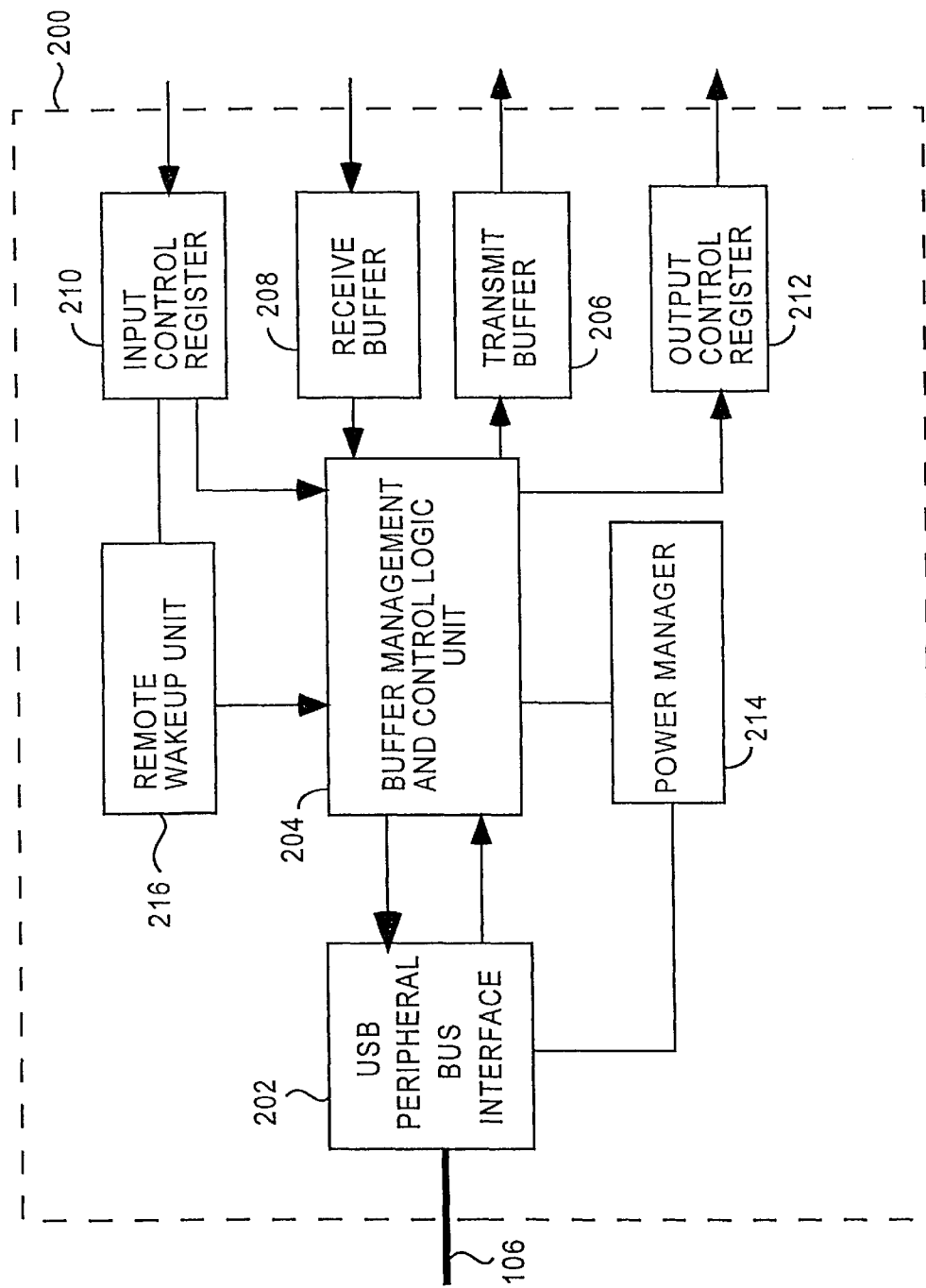
FIG. 2 is a block diagram of a bus interface according to an embodiment of the invention.

FIG. 2 is a block diagram of a bus interface 200 according to an embodiment of the invention. The bus interface 200, for example, can be used as the USB bus interface 118 of the modem codec board 104 illustrated in FIG. 1.

The bus interface 200 includes a USB peripheral bus interface 202 that couples to the USB bus 106. Data packets are transmitted over the USB bus 106 to and from the bus interface 200. The USB peripheral bus interface 202 manages the transmission of data packets over the USB bus 106. Incoming data packets over the USB bus 106 are supplied to a buffer management and control logic unit 204. The buffer management and control logic unit 204 then forwards the data packets to a transmit buffer 206. In one embodiment, the transmit buffer 206 is a circular buffer with a length of 64 bytes. The data packets include data and control information. The control information is evaluated by the buffer management and control logic unit 204 which controls the bus interface 200 as appropriate given the control information.

Similarly, incoming data from the transmission media (via the hybrid circuit 122 and the codec 120) are supplied to the bus interface 200. The incoming data over the transmission media are stored in a receive buffer 208. In one embodiment, the receive buffer 208 is a circular buffer with a length of 64 bytes. The buffer management and control logic unit 204 retrieves the incoming data stored in the receive buffer 208 as needed, forms data packets, and periodically supplies data packets to the USB peripheral bus interface 202 for forwarding to the computer 102 over the USB bus 106. In forming the data packets, the buffer management and control logic unit 204 can include control information together with data information in the data packets. The buffer management and control logic unit 204 can also evaluate incoming control information from the transmission media and accordingly control the bus interface 200 as discussed below in greater detail.

As for control information, the bus interface 200 receives incoming control information through an input control register 210. The incoming control information is supplied from the hybrid circuit 122 and latched into the input control register 210. Examples of incoming control information are a ring indication signal and an on/off hook indication signal. The input control register 210 forwards the incoming control information to the buffer management and control logic unit 204. The buffer management and control logic unit 204 in turn controls the USB interface 200 in accordance with the incoming control information and/or forwards the control information (or a modified version thereof) over the USB bus 106. Typically, the incoming control information would be sent to the USB host controller 114 that manages the activities on the USB bus 106. The USB host controller 114 can also supply the incoming control information to application device drivers so that applications executing on the host processor 102 are also made aware of the state of the modem codec board 104.

Also, the bus interface 200 also receives host-side control information over the USB bus 106 (i.e., from the USB host controller 114 and or application device drivers) at the USB peripheral bus interface 202 which forwards the host-side control information to the buffer management and control logic unit 204. The buffer management and control logic unit 204 in turn controls the USB interface 200 in accordance with the host-side control information and/or forwards control information to the codec 120 and hybrid circuit 122 via an output control register 212. Of course, the control information can be modified or altered by the buffer management and control logic unit 204 before setting the state of the output control register 212 so as to convey appropriate control information.

The bus interface 200 further includes a power manager 214. The power manager 214 operates to manage the power of modem codec board 104 such that it complies with the USB specification. In particular, the power manager 214 can place the codec 120 and the hybrid circuit 122 in a low power state or an active power state. The power manager 214 typically signals a low-power state to the codec 120 and the hybrid circuit 122 via the output control register 212 when the USB bus 106 has been suspended. The power manager 214 also typically signals an active state to the codec 120 and the hybrid circuit 122 via the output control register 212 when the USB bus 106 is active.

The control information received either over the USB link 106 or the input control register 210 can include power control information. The power control information is used by the power manager 214 to manage the power of the modem codec board 104. Although the power manager 214 is within the USB bus interface 200, the power manager 214 working together with the buffer management and control logic unit 204 can manage the power of the codec 120 and the hybrid circuit 122 using the output control register 212. With such power management, the power consumption of the modem codec board 104 is approximately 80 mA at 5 volts in the active state and is less than 500 $\mu$A in the low power state.

The bus interface 200 also includes a remote wakeup unit 216. The remote wakeup unit 216 is able to monitor the input control register 210 and determine if a wakeup request has been made by the modem codec board 104 due to incoming signals over the transmission media. The input control register 210 receives certain control information from the hybrid circuit 122. For example, if a ring indication signal is received or an on-hook to off-hook transition on the on/off hook indication signal is detected, the remote wakeup unit 216 of the modem codec board 104 detects the need to wakeup if in the suspend mode and to provide the buffer management and control logic unit 204 with a wakeup request. The buffer management and control logic unit 204 together with the USB peripheral bus interface 202 then operate to send a wakeup request over the USB bus 106 to the host USB controller 114. In one embodiment, the wakeup of the USB bus 106 is controlled by the USB bus controller 114 which also wakes up the modem codec board 104 by signaling the USB bus interface 200 to wakeup via the USB bus 106. Upon receiving the wakeup request from the USB host controller 114, the power manager 214 of the USB bus interface 200 then wakes up the codec 120 and the hybrid circuit 122 of the modem codec board 104.

Figure 3:
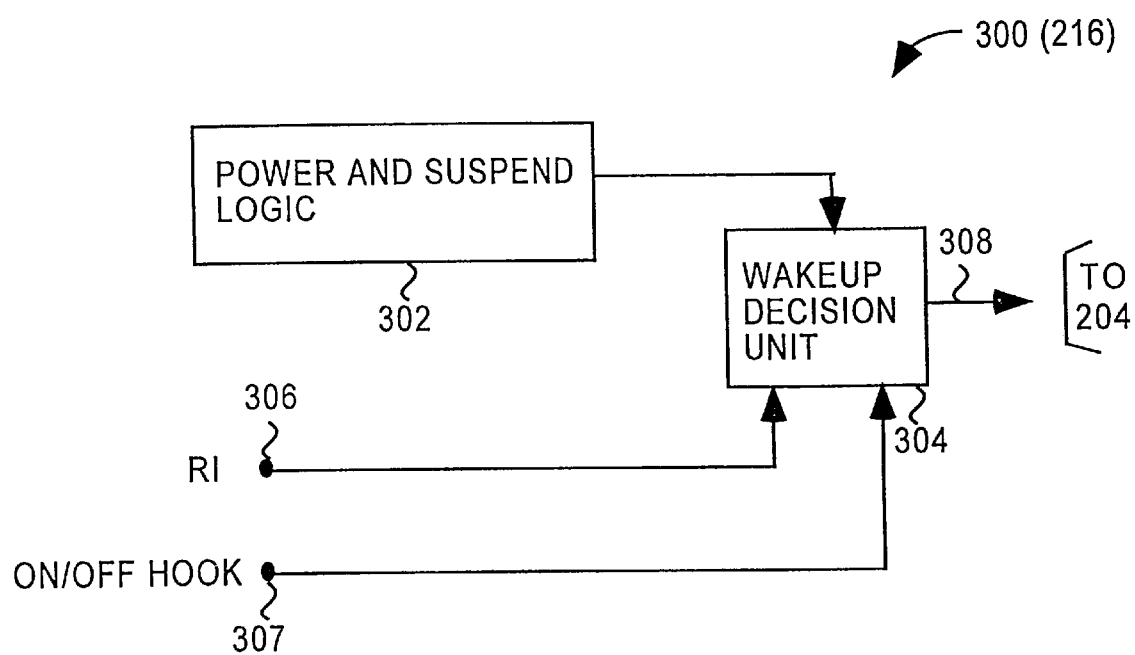
FIG. 3 is a block diagram of a remote wakeup unit according to an embodiment of the invention.

FIG. 3 is a block diagram of a remote wakeup unit 300 according to an embodiment of the invention. The remote wakeup unit 300 can be used as the remote wakeup unit 216 illustrated in FIG. 2.

The remote wakeup unit 300 includes power and suspend logic 302 that provides information about whether the USB bus interface 200 is in a powered state and whether or not the mode is a suspend mode or an active mode. The remote wakeup unit 300 also includes a wakeup decision unit 304. The wakeup decision unit 304 receives the information from the power and suspend logic 302 as well as receives a ring indication signal 306 and a on/off hook indication signal 307. The ring indication signal 306 and the on/off hook indication signal 307 are provided by the hybrid circuit 122 and directed to the input control register 210 of the bus interface 200. In general, the ring indication signal 306 and the on/off hook indication signal 307 are examples of external event signals that can be supplied to the bus interface 200. In one embodiment, a Data Access Arrangement (DAA) includes a hybrid circuit 122 and a line interface. The line interface provides the ring indication signal 306 and the on/off hook indication signal 307 that are supplied to the remote wakeup unit 300. A decision signal 308 output from the wakeup decision unit 304 is supplied to the buffer management and control logic unit 204 of the USB bus interface 200. The wakeup unit 300 determines whether the USB bus 106 and at least the codec 120 of the modem codec board 104 needs to be awakened based on the information from the power and suspend logic 302 as well as from the external event signals. The remote wakeup unit 300 thus notifies the buffer management and control logic unit 204 when it desires to wakeup from a suspend mode to be placed in an active mode. Here, the ring indication signal 306 indicates that incoming signals will be provided to the codec modem apparatus 104 over the transmission media, namely phone lines. The buffer management and control logic unit 204 can then inform the USB peripheral bus interface 202 to send a wakeup (or resume) signal to the USB host controller 114 upon which the codec 120 is set in an active state so that the incoming data can be properly received.

Figure 4:
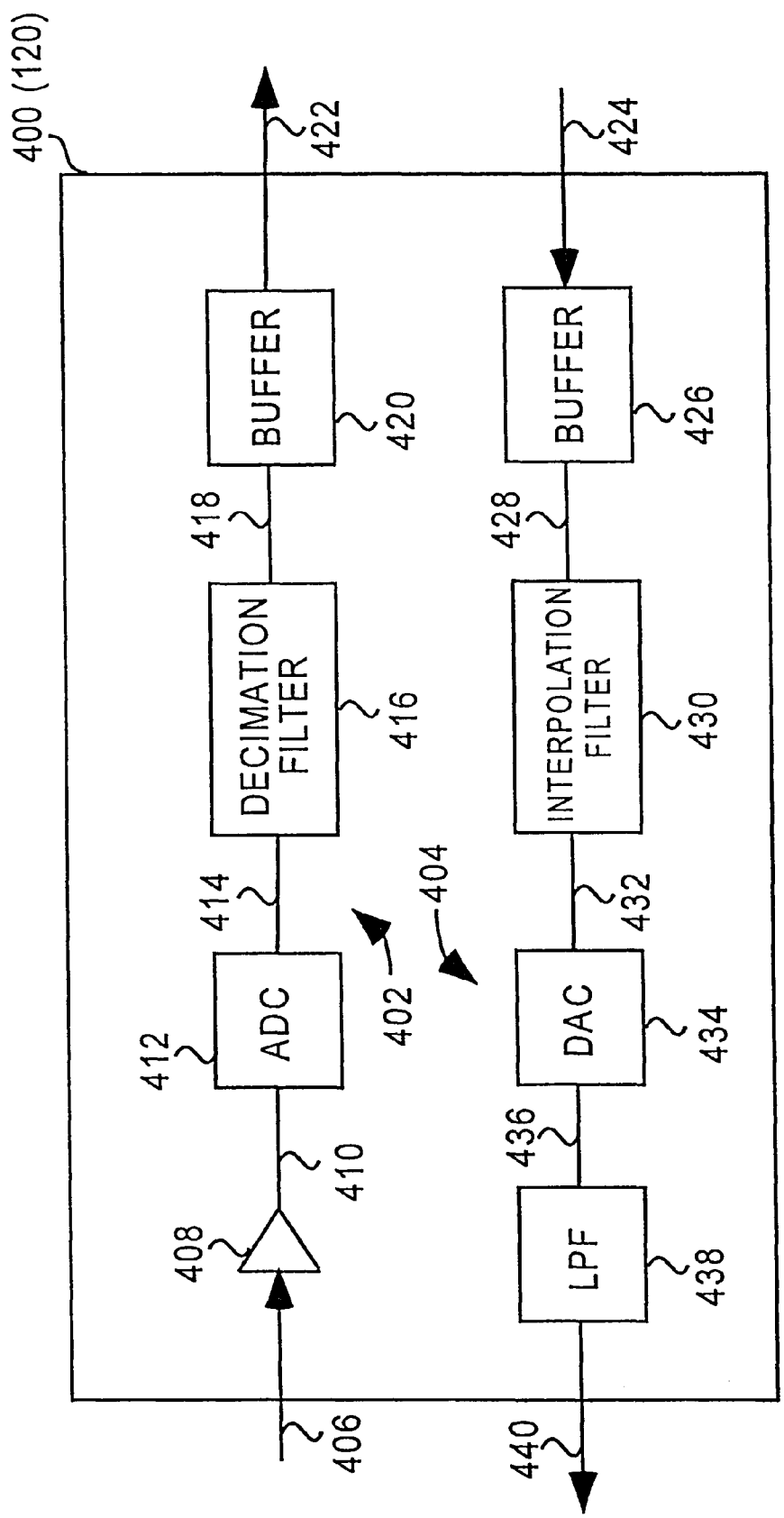
FIG. 4 is a block diagram of a codec according to an embodiment of the invention.

FIG. 4 is a block diagram of a codec 400 according to an embodiment of the invention. The codec 400 is, for example, suitable for use as the codec 120 illustrated in FIG. 1. The codec 400 uses high over sampling rate conversion (e.g., 256 times) and digital filtering. The codec 400 includes a receive path 402 and a transmit path 404.

The receive path 402 receives analog signals 406 from the transmission media. The analog signals are initially filtered by an anti-aliasing filter then gain adjusted by an amplifier 408 that produces amplified analog signals 410. The amplified analog signals 410 are then supplied to an analog-to-digital converter (ADC) 412. In one embodiment, the analog-to-digital converter 412 is implemented as a Sigma Delta type ADC that in effect samples the amplified (and conditioned) analog signals 410. The analog-to-digital converter 412 outputs digital signals 414. The digital signals 414 are then supplied to a decimation filter 416 that down-samples the signals to its sampling rate and outputs down-sampled digital signals 418. The down-sampled digital signals 418 are then temporarily clocked into a shift register buffer 420. The USB bus interface 118 retrieves data from the buffer 420 as received data signals 422 and stores the received data signals 422 in the receive buffer 208 of the USB bus interface 200.

The transmit data path 404 initially begins by the USB host controller 114 in the computer 102 forwarding data packets to the USB bus interface 118 over the USB bus 106. Transmit data signals 424 to the codec 400 over the USB bus 106 are stored in the transmit buffer 206 of the USB bus interface 200. The transmit path 404 then begins by supplying the transmit data signals 424 obtained from the transmit buffer 206 of the USB bus interface 200 to a shift register buffer 426 within the codec 400. The transmit data signals 424 that are supplied to the USB bus interface 200 over the USB bus 106 have been already modulated for their transmission over the transmission media using the processing operations performed by the microprocessor 108. In accordance with a transmit clock, the transmit data signals stored in the buffer 426 are supplied to an interpolation filter 430 as transmit data signals 428. The interpolation filter 430 filters the digital transmit signals 428 and produces filtered digital transmit signals 432. The filtered digital transmit signals 432 are then supplied to a digital-to-analog converter (DAC) 434. In one embodiment, the digital-to-analog converter 434 is implemented as a Sigma Delta type DAC that in effect modulates the filtered digital transmit signals 432. The digital-to-analog converter 434 converts the filtered digital transmit signals 432 into analog transmit signals 436. The analog transmit signals 436 are then supplied to a low pass filter (LPF) 438. The LPF 438 filters out high frequency portions of the analog transmit signals 436 to produce transmit signals 440 that are transmitted over the transmission media.

Preferably, with the exception of the amplifier 408 and the LPF 438, the codec 400 is implemented in digital circuitry.

An advantage of the Sigma Delta units is that they are implemented in digital circuitry, unlike conventional ADCs and DACs. The digital circuitry facilitates low power consumption which is needed to satisfy the USB specifications on power consumption. Further, to conserve power when the USB bus 106 is in a suspend mode, the codec 400 operates to power down to a low-power state at least a portion of its hardware components. Other circuitry within the modem codec board 104 can also be suspended by turning off various functional blocks such as associated with clocks and buffering. However, preferably, a least a portion of the hybrid circuit 122 remains active even during the suspend mode of the USB bus 106 so that incoming signals can be recognized and used by the remote wakeup unit 216 to request wakeup of the USB bus 106 and any components of the modem codec board 104 in a low-power mode.

Figure 5:
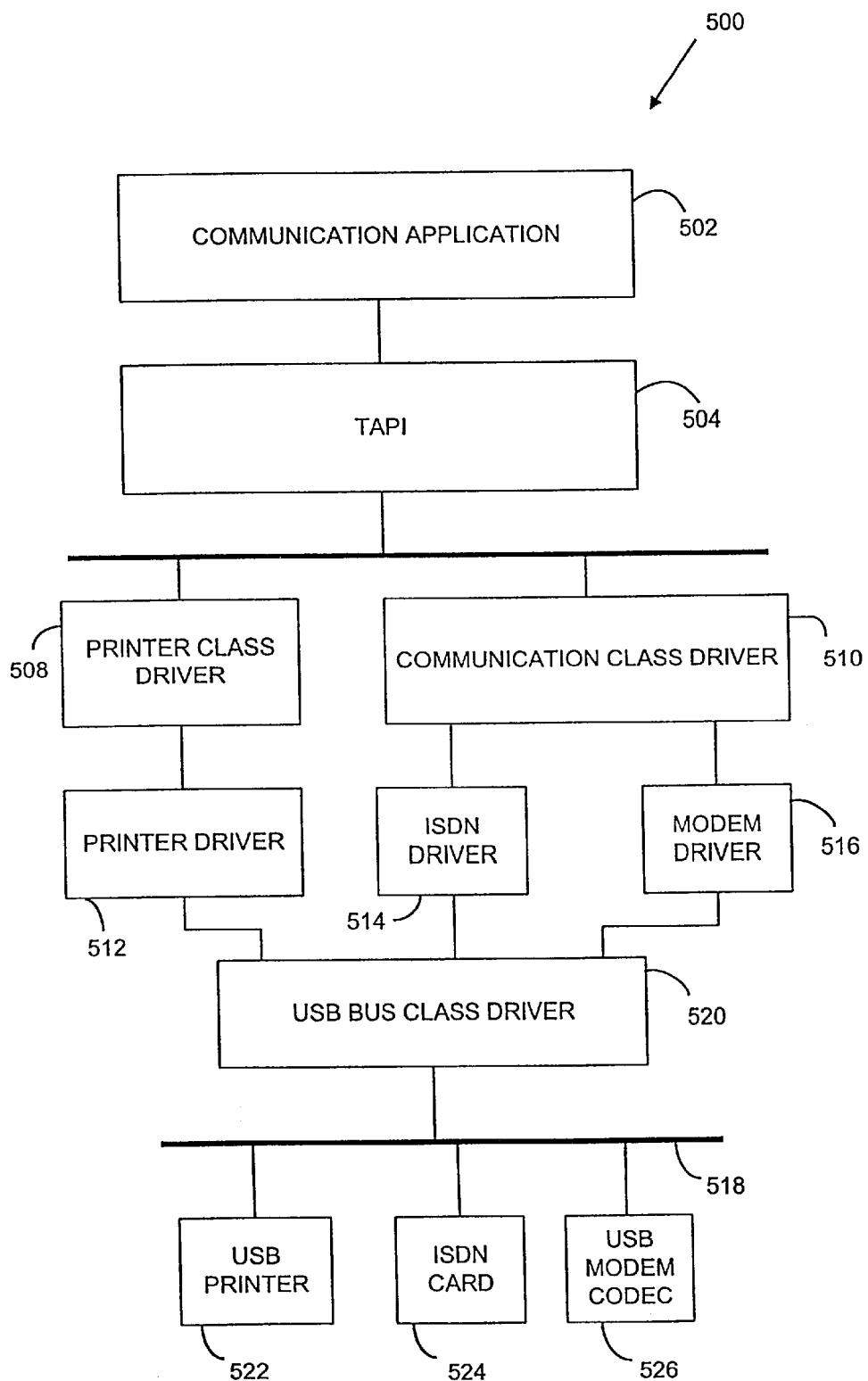
FIG. 5 is a diagram of a software driver stack according to an embodiment of the invention.

FIG. 5 is a diagram of a software driver stack 500 according to an embodiment of the invention. For the most part, the software driver stack 500 resides on the computer 102. The software driver stack 500 includes a communication application 502 at the top of the software driver stack 500. The communication program 502 is, for example, a application program or an operating system program that executes on the computer 102. In communicating with peripheral devices, the communication application 502 communicates with a telephony application programming interface (TAPI) layer 504. The TAPI layer 504 then communicates with class drivers. Specifically, as illustrated in FIG. 5, the TAPI layer 504 can communicate with either a printer class driver 508 or a communications class driver 510. The printer class driver 508 in turn communicates with a printer driver 512. Similarly, the communication class driver 510 communicates with various drivers associated with communication devices, namely, an ISDN driver 514 and a modem driver 516. In the software driver stack 500 illustrated in FIG. 5, each of the printer driver 512, ISDN driver 514 and the modem driver 516 is using a USB bus 518. Accordingly, a USB bus class driver 520 is included in the software driver stack 500 and used to interact with the USB bus 518. Hence, the printer driver 512, the ISDN driver 514, and the modem driver 516 use the USB bus class driver 520 to communicate to the physical peripheral devices over the USB bus 518. The physical peripheral devices associated with the printer driver 512, the ISDN driver 514 and the modem driver 516 are respectively coupled to the USB bus 518 as the USB printer 522, a ISDN card 524, and a USB modem codec 526. Although illustrated in FIG. 5, the USB bus 518 as well as the USB printer 522, the ISDN card 524 and USB modem codec 526 are physical devices and are therefore not part of the software driver stack 500.

Figure 6A:
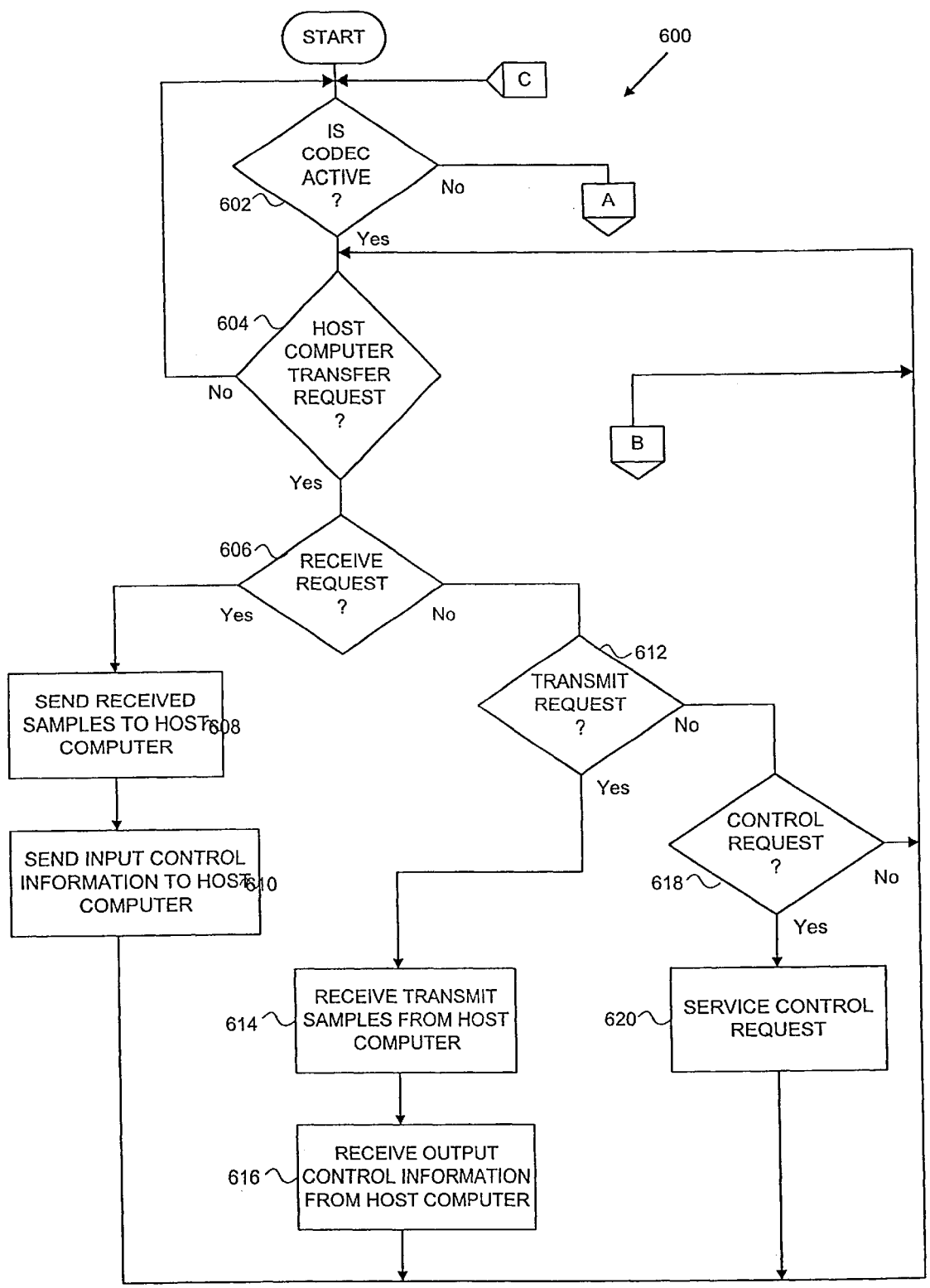
FIGS. 6A and 6B are flow diagrams of bus activation processing according to an embodiment of the invention.
Figure 6B:
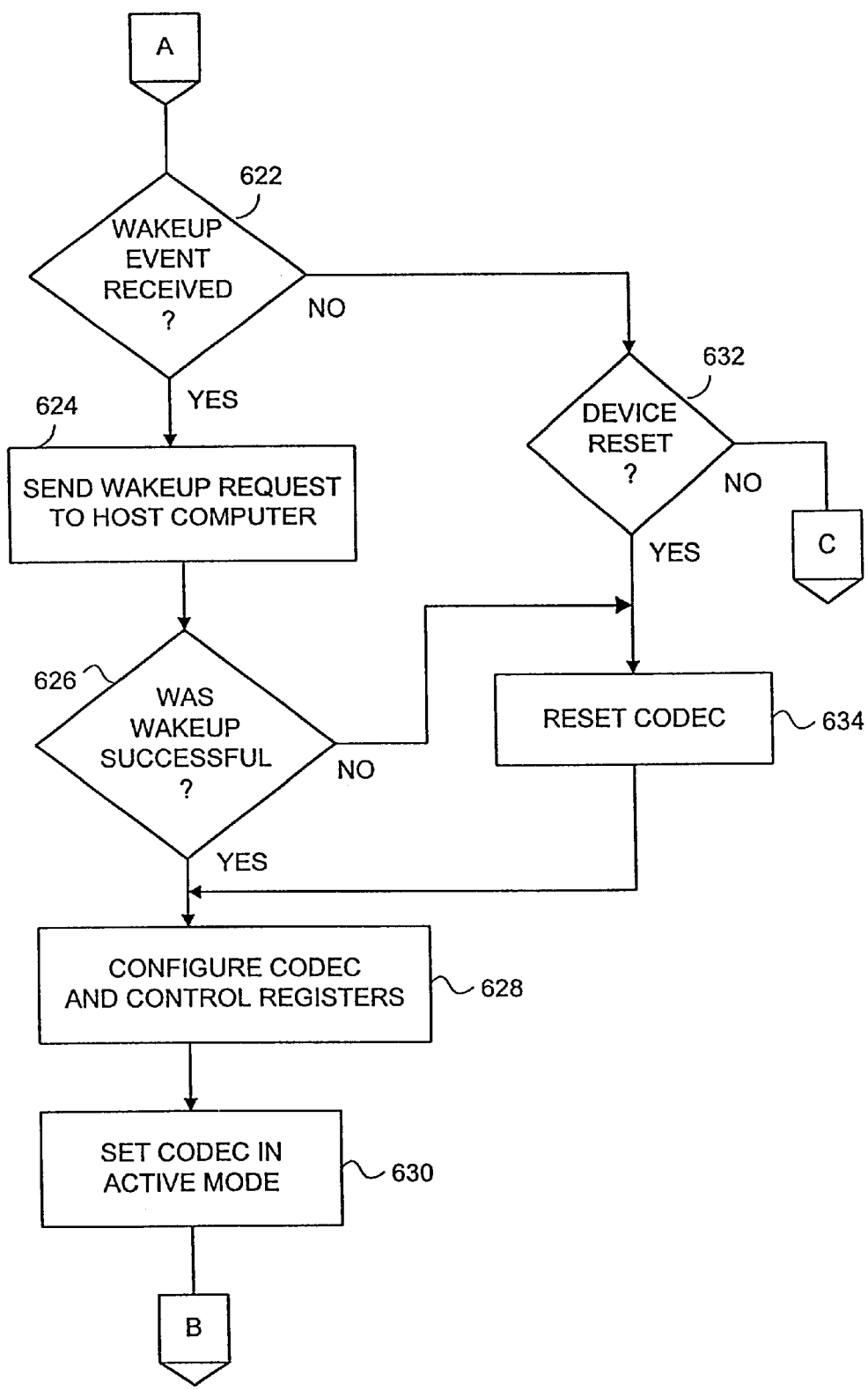

FIGS. 6A and 6B are flow diagrams of bus utilization processing 600 according to an embodiment of the invention. The bus utilization processing 600 is performed by the USB bus interface 118 of the modem codec board 104 illustrated in FIG. 1 or the bus interface 200 illustrated in FIG. 2.

Once the codec modem board 104 becomes active, receive and transmit data packets are periodically exchanged between the computer 102 and the codec modem board 104 over the USB bus 106. This periodic exchange of data packets is performed by an isochronous pipe in a the transmit direction and an isochronous pipe for transmissions in the opposite direction. Each of these isochronous pipes are within the USB bus 106 and are serviced by the USB host controller 114 about every 1 ms. As an example, the buffering of the transmit and receive data provided by the transmit buffer 206 and the receive buffer 208, respectively, are able to store approximately 2 ms of data so that the transmit buffer 206 and the receive buffer 208 do not overflow or underflow and cause loss of data continuity. Consequently, essentially real-time data transfer is able to be achieved over the USB bus 106.

The bus utilization processing 600 explains the activation of the codec 120 when needed and requested, and the subsequent transfer of data packets between the computer 102 and the codec modem board 104 over the USB bus. The bus utilization processing 600 initially begins with a decision block 602 that determines whether the codec 120 is active. When the codec 120 is determined to be active, a decision block 604 then determines whether the host computer 102 is making a transfer request. Here, the bus interface 118, 200 determines whether the host computer 102 is requesting to transfer signals over the USB bus 106 to the modem codec board 104. When the decision block 604 determines that the host computer 102 is not making a transfer request, the bus utilization processing 200 returns to repeat the decision block 602 and subsequent blocks.

On the other hand, when the decision block 604 determines that the host computer 102 is making a transfer request, the bus utilization processing 600 continues. Namely, a decision block 606 determines whether the transfer request by the host computer 102 is a receive request. A receive request indicates that the host computer 102 desires to read samples (data packet) from the modem codec board 104.

When the decision block 606 determines that the transfer request is a receive request, then the USB bus interface 118, 120 operates to send 608 receive samples to the host computer 102. Additionally, the USB bus interface 118, 120 also sends 610 input control information to the host computer 102. Following block 610, the bus utilization processing 600 returns to repeat the decision block 604 and subsequent blocks for subsequent transfer requests by the host computer 102.

When the decision block 606 determines that the transfer request is not a receive request, then the bus utilization processing 600 operates differently. Specifically, a decision block 612 determines whether the transfer request by the host computer 102 is a transmit request. If the decision block 612 determines that the transfer request is a transmit request, then the USB bus interface 118, 120 operates to receive 614 transmit samples from the host computer 102. Additionally, the USB bus interface 118, 120 receives 616 output control information from the host computer 102. Following block 616, the bus utilization processing 600 returns to repeat the decision block 604 and subsequent blocks for subsequent transfer requests by the host computer 102.

On the other hand, when the decision block 612 determines that the transfer request is not a transmit request, then a decision block 618 determines whether the transfer request is a control request. When the transfer request is determined to be a control request, the control request is serviced 620 and then the bus utilization processing 600 returns to repeat the decision block 604 and subsequent blocks for subsequent transfer requests by the host computer 102. Alternatively, when the decision block 618 determines that the transfer request is not a control request, the bus utilization processing 600 simply returns to repeat the decision block 604 and subsequent blocks because in this case the transfer request is not of a type that is identifiable by the USB bus interface 118, 120.

The bus utilization processing 600 also initially performs activation processing when the codec 120 is not in an active mode when the bus utilization processing 600 begins. More specifically, when the decision block 602 determines that the codec 120 is not active, then the bus utilization processing 600 performs a series of processing events to activate the codec 120.

Initially, following the decision block 602 when the codec 120 is in a suspend mode (i.e., not in an active mode), a decision block 622 determines whether a wakeup event has been received. As an example, the wakeup event can be received by the USB bus interface 118 from the hybrid circuit 122 or, more particularly, the wakeup event can be produced by the remote wakeup unit 216 and forwarded to the buffer management and logic control unit 204. When the decision block 622 determines that a wakeup event has been received, a wakeup event is sent 624 to the host computer 102 by the USB bus interface 118, 200. As an example, the buffer management and logic control unit 204 can operate to initiate the sending of the wakeup request to the host computer 102 via the USB peripheral bus interface 202.

Next, following the block 624, a decision block 626 determines whether the wakeup has been successful. Here, the decision block 626 determines whether the host computer 102 and the USB device 104 have successfully negotiated the resume signaling. If the wakeup has been successful, the bus utilization processing 600 operates to configure the codec 120 and control registers of the USB bus interface 118, 200. Thereafter, the codec 120 is set 630 in an active mode. As an example, the USB bus interface 200 can cause the codec 120 to be set 630 in the active mode by setting the output control register 212 in a predetermined manner. Following block 630, the activation processing portion of the bus utilization processing 600 is completed and then control returns to the decision block 604 and subsequent blocks of the bus activation processing 600 described above.

On the other hand, when the decision block 622 determines that a wakeup event has not been received, then a decision block 632 determines whether a device reset is needed. When the decision block 632 determines that a device reset is needed, such as when a peripheral device has just been attached to the USB bus 106, the codec 120 is reset 634. Also, when the decision block 626 determines that the wakeup request to the host computer 102 was not successful, then the codec 120 is also reset 634. Following the block 634, the bus utilization processing 600 directs processing to the block 628 for activation of the codec 120. Still further, when the decision block 632 determines that the device reset is not needed, then the bus utilization processing 600 directs processing to return to the decision block 602.

Figure 7:
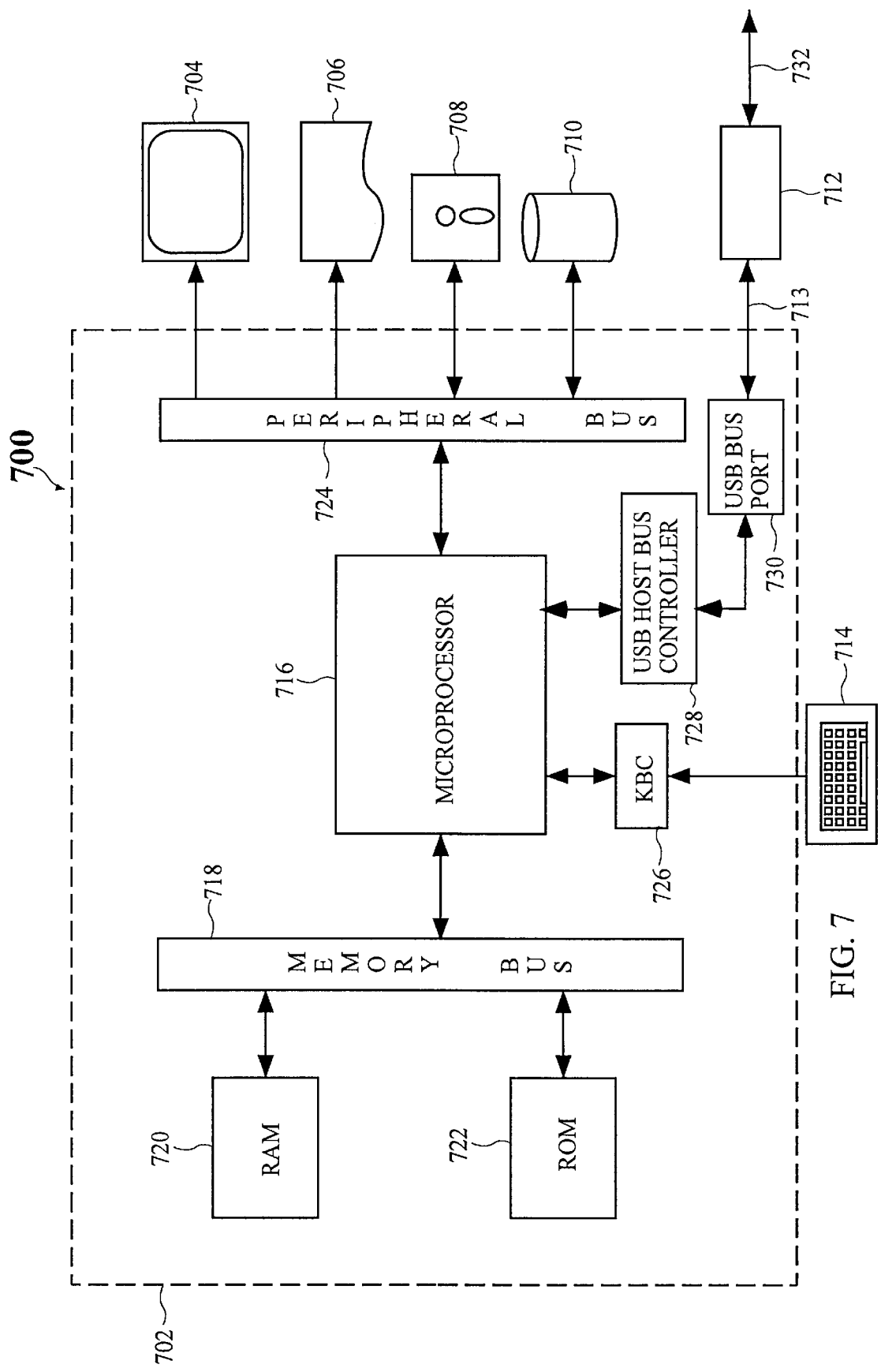
FIG. 7 is a block diagram of an exemplary computer system for hosting a USB bus and a USB host controller according to an embodiment the invention.

The invention can be employed in various different computer systems. The computer systems are normally general purpose machines, but could also be specialized machines. FIG. 7 is a block diagram of an exemplary computer system 700 for hosting a USB bus and a USB host controller according to an embodiment the invention. The computer system 700 is explained in more detailed than was the computer 102 illustrated in FIG. 1.

The computer system 700 includes a digital computer 702, a display screen (or monitor) 704, a printer 706, a floppy disk drive 708, a hard disk drive 710, a USB device 712, a USB bus 713, and a keyboard 714. The digital computer 702 includes a microprocessor 716, a memory bus 718, random-access memory (RAM) 720, read-only-memory (ROM) 722, a peripheral bus 724, a keyboard controller 726, a USB host controller 728, and a USB bus port 730. The USB device 712 is, for example, a modem codec apparatus such as the modem codec board 104, and is thus often connected to phone lines 732. The digital computer 700 can pertain to a wide variety of different types of computers, but is often a personal computer such as an IBM compatible personal computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to manage and control the USB host controller 728 and the USB bus 713 coupled thereto. Further, when the USB device 712 is a modem codec apparatus such as the modem codec board 104, the microprocessor 716 is also responsible for performing host-based modem operations such as modulation and demodulation processing. The USB host controller 728 can be implemented in a combination of hardware, firmware or software.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, and the hard disk drive 710.

The USB host controller 712 is used to control and manage a USB bus 713 that is supplied to the USB bus port 730. The USB bus 713 is a special peripheral bus that can be used to access the input, output, and storage devices used by the digital computer 702. By connecting a USB device 712 (e.g., a peripheral device) to the USB bus port 730, the USB device 712 connects to the USB bus 713. One or more USB devices (peripheral devices or USB hubs) are able to connect to the digital computer 702 by connecting to the USB bus 713. For example, one or more of the display screen 704, the printer device 706, the floppy disk drive 708, the hard drive 710 could be connected to the USB bus 713 instead of connecting directly to the peripheral bus 724. Similarly, other devices such a network interface connection are able to be connected to the USB bus 713 to send and receive data over a network connected to other computer systems.

The keyboard controller 726 is used to receive input from keyboard 714 and send decoded symbols for each pressed key to microprocessor 716. The display screen 704 is an output device that displays images of data provided by the microprocessor 716 via the peripheral bus 724 or provided by other components in the computer system 700. The printer device 706 when operating as a printer provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 720. The computer code and data could also reside on a removable computer readable medium and loaded or installed onto the computer system 700 when needed. Removable program mediums include, for example, CD-ROM, PC-CARD, floppy disk and magnetic tape.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The advantages of the invention are numerous. One advantage of the invention is that a bus-powered peripheral codec is made available. Examples are a modem codec, a video codec, a pulse coded modulation (PCM) codec, and the like. The peripheral codec is a peripheral device that couples to a computer over a bus, such as a USB bus, and does not require any external power source other than the power provided over the bus itself. Another advantage of the invention is that the peripheral codec has a low gate count and manageable power consumption such that the peripheral codec is able to be bus-powered. Still another advantage of the invention is that, in the case of bus-powered devices, the low power utilization of the peripheral codec prolongs battery life due to its low power consumption. Yet another advantage of the invention is that, in the case where the peripheral codec is used to form a modem codec, the peripheral codec can facilitate remote wakeup of the host computer and/or the peripheral codec based on external events.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. For example, the modem codec board could be replaced by an audio codec board for production of audio signals. Hence, all suitable modifications and equivalents may be resorted to as falling within the scope of the invention.

What is claimed is:

1. A computer system comprising:
   a computer including a microprocessor, memory and a bus host controller;
   a bus operatively connected to said computer, said bus being controlled by the bus host controller; and
   a codec apparatus operatively connected to said computer via said bus, said codec apparatus being completely powered by said bus, wherein said bus is a serial bus, said codec apparatus is a codec modem, and said codec modem comprises a codec for performing analog-to-digital conversions on incoming signals and digital-to-analog conversions on outgoing signals;
   a hybrid circuit, said hybrid circuit couples the outgoing signals to a transmission medium and couples incoming signals to the transmission medium; wherein the serial bus is a USB bus and said codec modem further comprises: a USB bus interface coupled between the USB bus and said codec and said USB bus interface comprises:
      a USB peripheral bus interface that couples to the USB bus and interacts with the serial bus host controller to transmit data packets between said computer and said codec modem;
      a transmit buffer that temporarily stores data to be transmitted by said codec modem over the transmission medium;
      a receiver buffer that temporarily stores data received by said codec modem over the transmission medium;
      a buffer management and control unit, said buffer management and control unit operates to manages said transmit buffer and said receive buffer and to control overall operation of said USB bus interface;
      a power manager, said power manager manages the power consumption of said modem codec based on a mode of the USB bus; and
      a remote wakeup unit, said remote wakeup unit monitors external signals and notifies said buffer management and control logic unit at least when a wakeup of the USB bus and/or said modem codec is needed.

2. A computer system as recited in claim 1, wherein the notification provided by said remote wakeup unit is further used to wakeup said computer.

3. A computer system as recited in claim 1, wherein said USB bus interface further comprises:
   a output control register, said output control register is used to inform at least one of said codec and said hybrid circuit to enter or leave a reduced-power mode.

4. A computer system as recited in claim 3, wherein said codec comprises:
   a receive path including at least an analog-to-digital converter that performs Sigma-Delta demodulation; and
   a transmit path including at feast a digital-to-analog converter that performs Sigma-Delta modulation.

5. A computer system as recited in claim 4,
   wherein the receive path further includes a decimation filter, and
   wherein the transmit path further includes an interpolation filter.

6. A computer system as recited in claim 3, wherein said codec comprises:
   a transmit path, said transmit path includes,
      an outgoing buffer that temporarily stores outgoing digital signals being received;
      an interpolation filter that performs interpolation processing on the outgoing digital signals to produce processed digital signals;
      a digital-to-analog converter that converts the processed digital signals to analog signals for transmission;
      a low pass filter that low pass filters the analog signals for transmission; and
   a receive path, said receive path includes,
      an amplifier that amplifies analog signals being received;
      an analog-to-digital converter that converts the amplified analog signals to digital signals;
      a decimation filter that performs decimation processing on the digital signals to produce processed digital signals; and
      an outgoing buffer that temporarily stores the processed digital signals.

7. A USB codec modem peripheral device that uses a host processor for modulation and demodulation processing, said USB codec modem peripheral device comprises:
   a USB bus interface coupled to the host processor via a USB bus;

a codec operatively connected to said USB bus interface, said codec performs analog-to-digital conversions on incoming signals and digital-to-analog conversions on outgoing signals; and a hybrid circuit operatively connected to said codec, said hybrid circuit couples the outgoing signals to a transmission medium and couples incoming signals to the transmission medium;

wherein said USB codec modem peripheral device does not include modem circuitry that performs modulation and demodulation operations and the host computer implements modulation and demodulation operations using the host processor of the host computer;

wherein a host computer includes the host processor and controls the USB bus using a serial bus host controller, and wherein said USB bus interface comprises:

a USB peripheral bus interface that couples to the USB bus and interacts with a serial bus host controller to transmit data packets between said computer and said codec modem;

a transmit buffer that temporarily stores data to be transmitted by said codec modem over the transmission medium;

a receiver buffer that temporarily stores data received by said codec modem over the transmission medium;

a buffer management and control unit, said buffer management and control unit operates to manages said transmit buffer and said receive buffer and to control overall operation of said USB bus interface; and a remote wakeup unit, said remote wakeup unit monitors external signals and notifies said buffer management and control logic unit at least when a wakeup of the USB bus and/or said modem codec is needed.

8. A computer system as recited in claim 7, wherein the notification provided by said remote wakeup unit is further used to wakeup said computer.

9. A computer system as recited in claim 7, wherein said USB bus interface further comprises:

a power manager, said power manager manages the power consumption of said modem codec based on a mode of the USB bus.

* * * * *